United States Patent [19]
Newsom

[11] 3,895,702

[45] July 22, 1975

[54] LOADING APPARATUS

[76] Inventor: Alfred T. Newsom, Rte. 4, Box 4, Brownfield, Tex. 79316

[22] Filed: Mar. 5, 1974

[21] Appl. No.: 448,335

[52] U.S. Cl. .................... 198/11; 198/88; 198/233; 214/41
[51] Int. Cl.² .................. B65G 41/00; B65G 67/08
[58] Field of Search ................. 214/41, 42 R, 83.26; 198/7, 7 BL, 8, 9, 11, 13, 88, 233

[56] References Cited
UNITED STATES PATENTS
| | | | |
|---|---|---|---|
| 2,327,494 | 8/1943 | Brown | 198/13 X |
| 2,776,763 | 1/1957 | Meyer et al. | 198/7 X |
| 2,844,240 | 7/1958 | Buck | 198/7 |

Primary Examiner—Robert G. Sheridan
Attorney, Agent, or Firm—Joseph H. Schley; Thomas L. Cantrell

[57] ABSTRACT

Disclosed is a loader for loading bulk material piled on the ground into a high sided cargo body, including a frame mountable on a prime mover and having a pick-up conveyor and a transfer conveyor mounted thereon. The part of the frame carrying the conveyors is movable to tilt the pick-up conveyor downwardly to engage the piled bulk material and to elevate the transfer conveyor, and to raise the pick-up conveyor upwardly for road travel operations.

3 Claims, 4 Drawing Figures

LOADING APPARATUS

BACKGROUND OF THE INVENTION

This invention relates to loading apparatus of the kind useful for loading bulk material arranged on the ground in long piles into high sided cargo bodies, such as trucks or trailers, for hauling.

When cotton is machine harvested, it is deposited by the harvesting machinery in the field in long low piles, as much as 7 feet wide, and typically running the length of the field. The most common method of loading it into trailers or trucks for transportation to a gin makes use of conventional front end bucket loaders, which scoop up bucketfuls, one at a time, and dump them into waiting vehicles. Each bucketful involves maneuvering of the loader from the pile to the vehicle and back. While this method is mechanized, it is still time consuming and inefficient, and tends to tie up transportation equipment and personnel. Some other loading operations, such as the loading of unbaled hay, present the same type of problem.

BACKGROUND OF THE PRIOR ART

Trucks with ground engaging front end conveyors for loading into a cargo body which is mounted on the truck itself have been proposed. See Spellman U.S. Pat. Nos. 3,263,844 and 3,493,136. It has also been proposed to employ vehicles with front end conveyors for handling baled materials, as distinguished from bulk materials. See U.S. Pat. Nos. 3,251,485; 3,510,013; and 3,722,722.

SUMMARY OF THE INVENTION

In accordance with the present invention there is provided a mobile apparatus for gathering and loading bulk material from the ground into a cargo body. The apparatus includes a prime mover and a pair of conveyors mounted on a frame above the prime mover. One conveyor is longitudinally oriented and in its operative position is tilted downwardly so that it nearly contacts the ground in front of the prime mover and, as the vehicle moves slowly up a long pile of material, picks it up and conveys it upwardly. The other conveyor is transversely oriented and is positioned behind and below the pick-up conveyor. It receives material from the upper or rear end of the pick-up conveyor, transfers it sideways, and discharges it into the cargo body of a truck or trailer moving through the field on a path parallel to that of the prime mover. Both conveyors are mounted on a frame which pivots them from an operative position, with the pick-up conveyor tilted down and the transfer conveyor elevated, to a roadable condition, with the pick-up conveyor substantially horizontal above the prime mover and the transfer conveyor in a tilted-down position behind and below it.

It is an object of the present invention to provide an improved means for gathering and loading bulk material from a field into a cargo body on a transportation vehicle.

It is another object of the invention to provide an improved loading apparatus of the front end conveyor type.

A further object of the invention is the provision of a loading apparatus which is easily convertible from an operating position to a roadable position.

The manner in which the foregoing objects, together with other objects and purposes, are accomplished may be best understood from a consideration of the detailed description which follows together with the accompanying drawings.

DESCRIPTION OF THE PREFERRED EMBODIMENT

Figure 1:
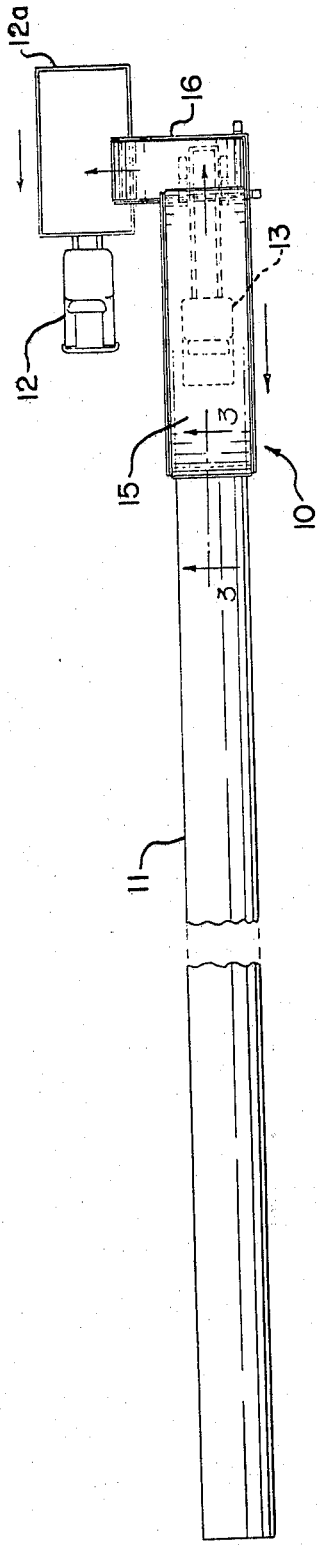
FIG. 1 is a somewhat diagrammatic plan view of a loading apparatus of the invention in operation loading cotton from a long pile on the ground.
Figure 2:
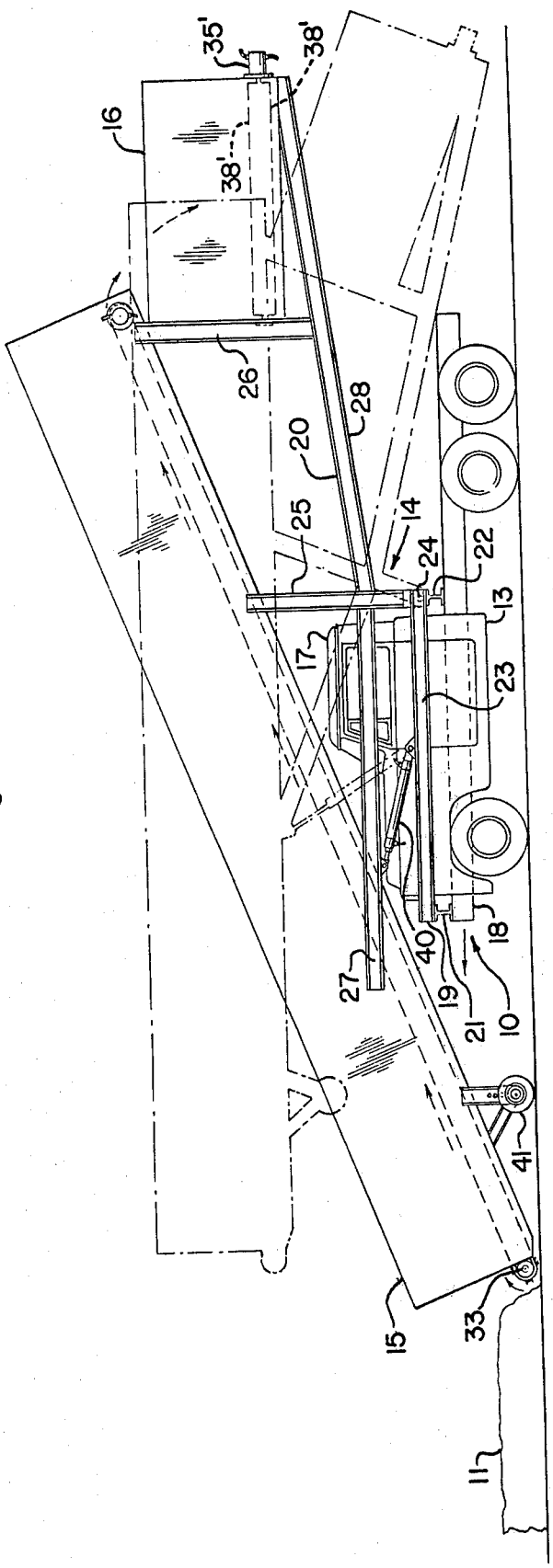
FIG. 2 is a side elevational view, on an enlarged scale as compared to FIG. 1, of the loading apparatus of the invention, with the equipment being shown in full lines in its operating position, and in dotted outlines in its roadable position.

Attention is first directed to FIGS. 1 and 2 in which the loading apparatus of the invention is designated generally as 10. It is shown in those figures in the process of loading a long pile 11 of harvested cotton lying in a field. The loading apparatus is accompanied through the field and along the pile by a transportation vehicle 12 having an open topped high sided cargo body 12a. The direction of movement of loading apparatus 10 and transport vehicle 12 is from right to left as FIGS. 1 and 2 are drawn, and as indicated by the arrows on those figures.

The primary components of the loading apparatus 10 are a prime mover 13, a frame designated generally as 14, a pick-up conveyor 15, and a transfer conveyor 16. The prime mover is a more or less conventional truck having an operator's cab 17, and a chassis 18, which is open and available for load supporting duty behind the cab 17.

The frame 14 has a fixed section 19 and a movable section 20. The fixed section 19 is built up of cross beams 21 and 22, and longitudinal beams 23 mounted on the forward half of chassis 18, and attached together to form a generally rectangular structure. Longitudinal beams 23 are positioned well outboard of cab 17 and do not interfere with the doors thereof.

At the rear end of the fixed frame section 19 is a transverse pivot axle 24, on which movable frame section 20 is pivotably mounted. Movable section 20 includes pairs of upwardly extending beams 25, and 26, forwardly extending beams 27, and rearwardly extending beams 28, together with cross beams, if desired, at various points which will not interfere with the pivoting action of frame section 20.

The pick-up conveyor 15 is mounted on the outer ends of the pairs of beams 25, 26, 27 in a position so that it is tilted down with its forward end nearly in contact with the ground in front of prime mover 13 when movable frame section 20 is pivoted forward (the position shown in full lines on FIG. 2), and is oriented substantially horizontally when the movable frame section 20 is pivoted back (the position shown in dot-and-dash outline in FIG. 2).

Figure 3:
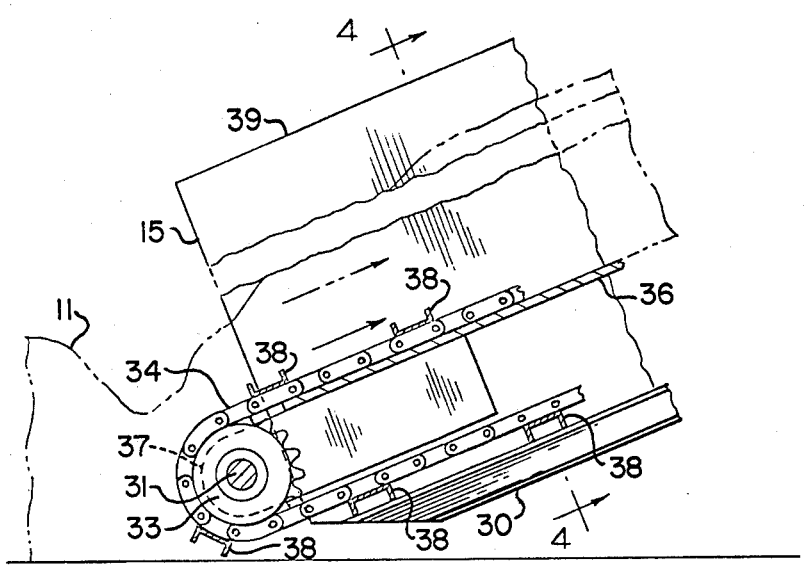
FIG. 3 is a fragmentary side elevational view, on a further enlarged scale, with some parts broken away and some parts broken out, of the front end of the pick-up conveyor.
Figure 4:
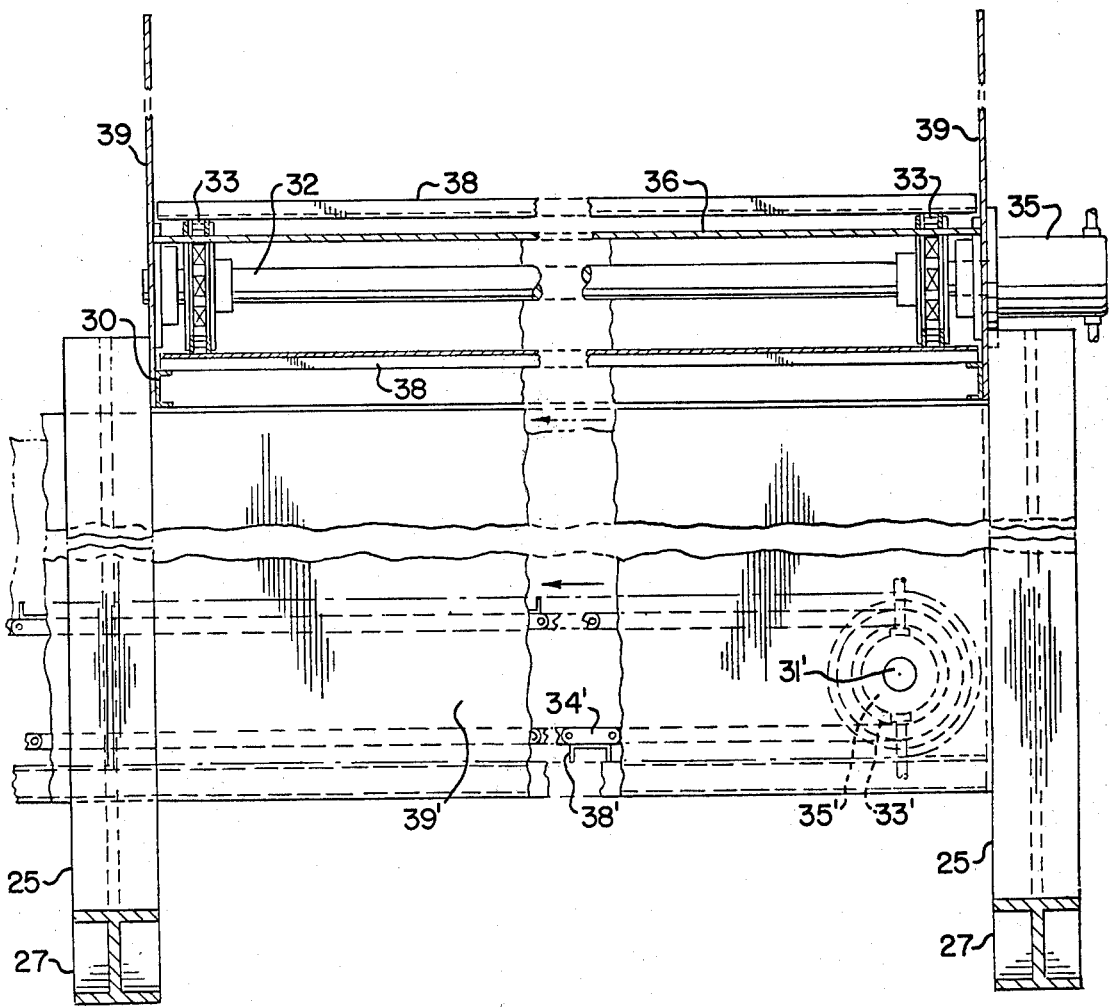
FIG. 4 is a sectional front elevational view of the conveyor apparatus, with some parts broken out and other parts broken away, the section being taken on the line 4—4 of FIG. 3.

As can best be seen in FIGS. 3 and 4, pick-up conveyor 15 has a frame 30 on which sprocket axles 31, 32 are mounted. Each axle has a pair of sprockets 33 mounted thereon near its outer ends. Trained around corresponding sprockets at opposite ends of the conveyor 15 are looped chains 34. The axle at the rear end of the conveyor 15 is driven by a hydraulic motor 35. The conveyor frame 30 includes a floor member 36 positioned to underlie the upper runs of chains 34 and to extend therebetween. Floor member 36 includes a portion 37 which is curled around the forward axle 31 of the conveyor. At spaced, preferably uniform, intervals along chains 34, the chains are united by channel shaped lug bars 38, which extend transversely across floor member 36. In operation, bars 38 engage the cotton or other bulk material and sweep it up the floor 36 of the conveyor. Conveyor 15 is provided with high side walls 39 to contain the cotton as it moves along the conveyor.

The structure of transfer conveyor 16, insofar as it relates to the arrangement of frame, sides, chains, lug bars, axles, drive motor and the like, is substantially the same as that of pick-up conveyor 15. For this reason the same reference characters, with a prime designation added, have been applied to the parts of conveyor 16 in the drawings, and reference is made to the above description of conveyor 15 for an understanding of the operation of conveyor 16.

Transfer conveyor 16 is mounted on frame 14 in the angle formed by beams 26 and 28 (FIG. 2) so that it is located on the frame below and behind the rear end of pick-up conveyor 15, in position to receive material discharged therefrom. The length of conveyor 16 is such that it extends across the full width of pick-up conveyor 15 and outwardly therebeyond on one side a distance sufficient to enable it to project over the side of cargo body 12a on the accompanying truck 12 (see FIG. 1).

From the foregoing it can be seen that the relative positions of the pick-up conveyor 15 and transfer conveyor 16 are always fixed, even though their absolute positions on the truck vary, depending upon the position of movable frame section 20. Means for tilting frame section 20 are provided in the form of hydraulic cylinder and piston units 40, (FIG. 2) which are mounted to work between fixed beams 23 and movable beams 27. With frame section 20 tilted to its forward position (full lines in FIG. 2), pick-up conveyor 15 is tilted downwardly to nearly meet the ground, and part of its weight is carried by auxiliary wheels 41. Transfer conveyor 16 is elevated to a level above the high side of an adjacent cargo body 12a. With frame section 20 tilted to its back position (dot and dash lines in FIG. 2), pick-up conveyor 15 is elevated to a substantially horizontal position above the cab 17 of truck 13, and out of the line of sight of the driver for road operations. Transfer conveyor 16 is lowered to an out-of-the-way position behind truck 13, but still supported by it.

In use, the loading machine of the invention typically moves through a field at about 5 feet per minute, accompanied by a cargo vehicle moving at the same speed. It is generally desirable that the linear speed of the pick-up conveyor chains be about twice the speed of the truck.

What is claimed is:

1. Apparatus for loading bulk material piled on the ground into a high-sided cargo body comprising
   a frame mounted on a self-propelled vehicle and having a stationary base section extending longitudinally of the vehicle and secured thereto at the front and medial portions of said vehicle,
   the frame having a movable section pivotally attached at its intermediate portion to the base section of said frame at the medial portion of said vehicle for forward and rearward swinging between forwardly inclined and substantially horizontal positions,
   a pick-up conveyor secured to and oriented longitudinally of the movable section of said frame and being so positioned thereon that its front end closely approaches the ground upon forward pivoting of said movable frame section and that the pick-up conveyor is oriented substantially horizontally when said section is pivoted rearwardly,
   means for pivoting said movable frame section between and for maintaining it in its forwardly inclined and substantially horizontal positions, and
   a transfer conveyor mounted on said movable frame section for movement therewith and oriented transversely thereof,
   the transfer conveyor being disposed below and behind the rear end of said pick-up conveyor and having one of its ends projecting laterally beyond the latter conveyor.

2. Bulk material loading apparatus as defined in claim 1 including
   a support wheel adjacent the front end of the pick-up conveyor in position to engage the ground upon forward pivoting of the movable section.

3. Bulk material loading apparatus as defined in claim 1 wherein
   the means for pivoting the movable frame section between and maintaining it in its positions extends between and is pivotally attached thereto and to the base frame section forwardly of the pivotal connection of said movable section to said base section at the medial portion of the vehicle.

* * * * *